United States Patent
Reibel et al.

(10) Patent No.: US 6,965,082 B2
(45) Date of Patent: Nov. 15, 2005

(54) FLEXIBLE FLAT CABLE

(75) Inventors: Denis Reibel, Herrlisheim (FR); Peter Grynaeus, Birkenau (DE); Michael Kalbe, Weinheim (DE); Horst Kober, Weinheim (DE)

(73) Assignee: Carl Freudenberg KG, Weinheim (DE)

(*) Notice: Subject to any disclaimer, the term of this patent is extended or adjusted under 35 U.S.C. 154(b) by 0 days.

(21) Appl. No.: 10/463,246

(22) Filed: Jun. 18, 2003

(65) Prior Publication Data

US 2004/0069525 A1 Apr. 15, 2004

(30) Foreign Application Priority Data

Jun. 21, 2002 (DE) .......................... 102 27 890

(51) Int. Cl.⁷ .................................. H01B 7/08
(52) U.S. Cl. .................................. 174/117 F
(58) Field of Search ............ 174/117 F, 117 FF, 174/120 C, 121 R, 121 A, 122 R, 124 R

(56) References Cited

U.S. PATENT DOCUMENTS

| 3,763,554 A | * 10/1973 | Early ........................ 29/828 |
| 5,036,166 A | * 7/1991 | Monopoli ................ 174/128.1 |
| 5,049,435 A | 9/1991 | Uno et al. .................. 428/209 |
| 5,276,759 A | * 1/1994 | Nguyen et al. ............. 385/114 |
| 5,342,997 A | * 8/1994 | Kanno et al. .......... 174/117 FF |
| 5,744,756 A | 4/1998 | Springer et al. ............ 174/110 |
| 2002/0062974 A1 | 5/2002 | Curro et al. ............... 174/68.1 |

FOREIGN PATENT DOCUMENTS

JP          62-40715          9/1987

* cited by examiner

*Primary Examiner*—Chau N. Nguyen
(74) *Attorney, Agent, or Firm*—Davidson, Davidson & Kappel, LLC

(57) ABSTRACT

A flexible flat cable includes at least two layers of nonwoven fabric, the fabric consisting of fibers selected from the group consisting of polyester, polyamide, polyolefin, syndiotactic polystyrene, polysulfone, and glass, the fabric having pores between the fibers, the flat cable also includes a first signal lead embedded between the at least two fibers and a binder disposed in the pores so as to provide the fabric with at least one of a dielectric strength of at least 500 V and a dimensional stability of at least 0.05% at a temperature of 140° C. over a period of 24 hours.

11 Claims, 2 Drawing Sheets

FLEXIBLE FLAT CABLE

Priority is claimed to German Patent Application DE 102 27 890.3-34, filed Jun. 21, 2002, which is incorporated by reference herein.

BACKGROUND

The present invention relates to a flexible ribbon cable or other flexible flat cable which is composed of at least one signal lead embedded between at least two layers of non-woven fabric.

U.S. Pat. No. 5,049,435, which is incorporated by reference herein, describes flexible printed circuit boards which are reinforced with nonwoven fabrics composed of polyaromatic amides, and which can be used as flat cables. To this end, the nonwoven fabrics composed of polyaromatic amides are impregnated with a heat-and/or light-curable resin.

Moreover, U.S. Pat. No. 5,744,756, which is incorporated by reference herein, describes a cable, which is insulated by meltblown microfibers.

SUMMARY OF THE INVENTION

An object of the present invention is to provide a flexible flat cable, which is easy and inexpensive to manufacture.

The present invention provides a flexible ribbon cable or other flexible flat cable which is composed of at least one signal lead embedded between at least two layers of non-woven fabric which are manufactured only from fibers of polyester, polyamide, syndiotactic polystyrene, polysulfone and/or of glass and whose pores between the fibers or filamentes are filled with a binder to such an extent that a dielectric strength of at least 500 V and/or a dimensional stability of at least 0.05% at a temperature of 140° C. over a period of 24 hours are present. Surprisingly, the ribbon cables or other flat cables according to the present invention exhibit a dielectric strength and a dimensional stability according to industry requirements even without using polyaromatic amides.

Preferably, signal leads having different cross sections and/or made of different materials are present in the ribbon or other flat cables. These signal leads can be light and/or current conductors. The electrical signal leads advantageously have a thickness of 5 to 200μm and the distance from each other is equal to or greater than their thickness. Advantageously, the pitch of the signal leads with respect to each other is 1.25; 1.27; 2.5 or 2.54 mm.

Preferably, the ribbon cable or other flat cable according to the present invention contains flame retardants which are introduced either together with the binder or during the deposition of the nonwoven fabric.

Particularly preferably contained as the flame retardant are leather fibers which, in particular, are leather fiber residues from the production of chrome leather.

Moreover, the present invention relates to a method for manufacturing a flat cable, such as a ribbon cable, using nonwoven fabrics which have an air permeability of 20 to 8000 mm/s at a pressure differential of 200 Pa and between which at least one signal lead is inserted into a nonwoven fabric impregnated with a binder in such a manner that a dielectric strength of at least 500 V and/or a dimensional stability of at least 0.05% at a temperature of 140° C. over a period of 24 hours are achieved.

Advantageously, the binder is applied to the nonwoven fabric layers in liquid, powder or fibrous form or as a film prior to connecting the nonwoven fabric layers to the signal lead.

According to the present invention, thermoplastic polymers, such as polyolefins, polyesters, polyimides, polyamides, polyurethanes, polyacrylates, or nitrile butyl rubber, or crosslinkable systems, such as polyurethanes, epoxy resin systems, or UV-crosslinkable products, are used as the binder.

Particularly preferred is a method in which the nonwoven fabric layers are laminated together with the signal lead to form a composite and are subsequently impregnated with a binder. The ribbon or flat cable is brought into the completed state either by drying and/or by cross-linking the binder solution and/or dispersion.

The ribbon or flat cables are used for wiring in vehicles or in household electrical appliances.

BRIEF DESCRIPTION OF THE DRAWINGS

The present invention will be described with respect to a preferred embodiment, in which.

DETAILED DESCRIPTION

Figure 1:
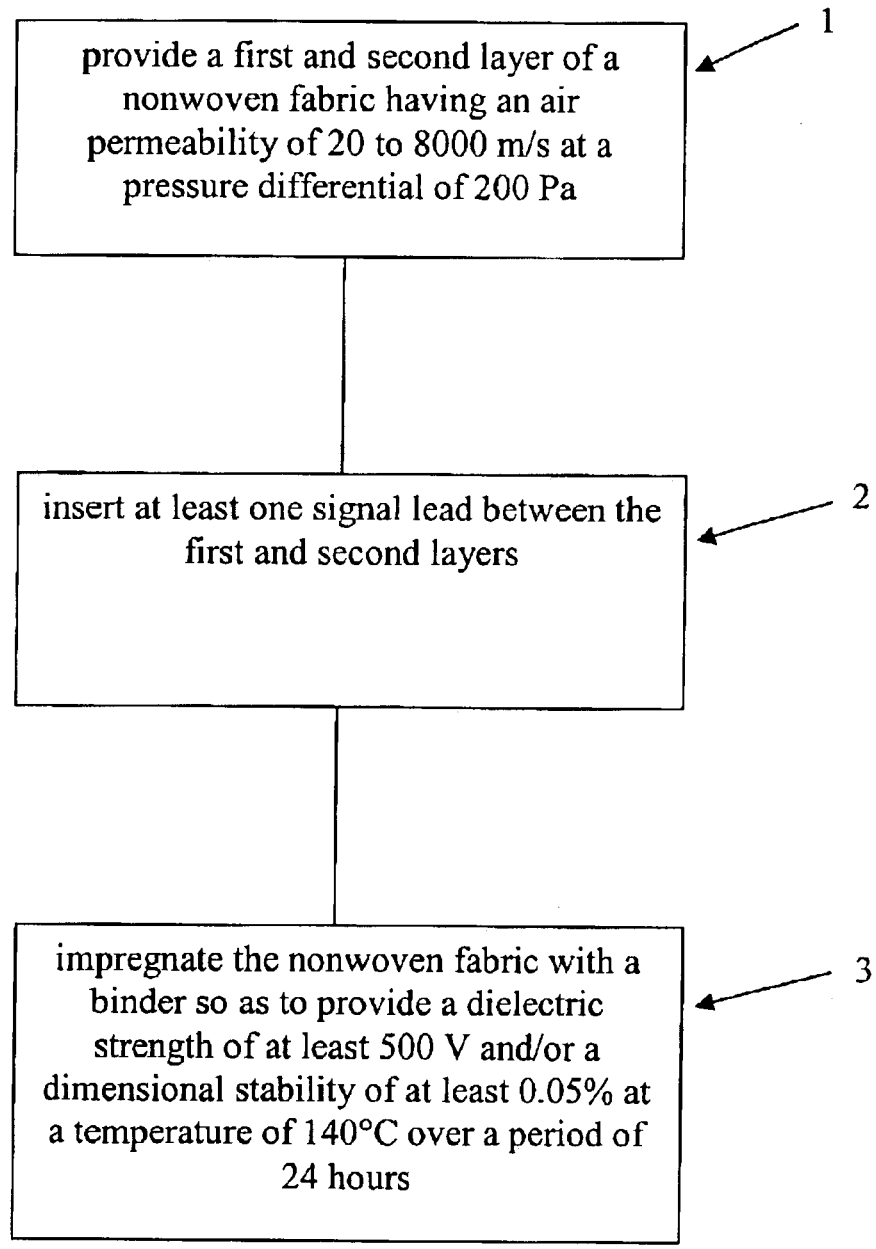
FIG. 1 shows a block diagram illustrating a method according to the present invention.

As shown in FIG. 1, a method for manufacturing a flat cable includes the step of providing a first and second layer of a nonwoven fabric. (See block 1). The nonwoven fabric has an air permeability of 20 to 8000 m/s at a pressure differential of 200 Pa. At least one signal lead is inserted between the first and second layers. (See Block 2). The nonwoven fabric is impregnated with a binder so as to provide a dielectric strength of at least 500 V and/or a dimensional stability of at least 0.05% at a temperature of 140° C. over a period of 24 hours. (See block 3).

Figure 2:
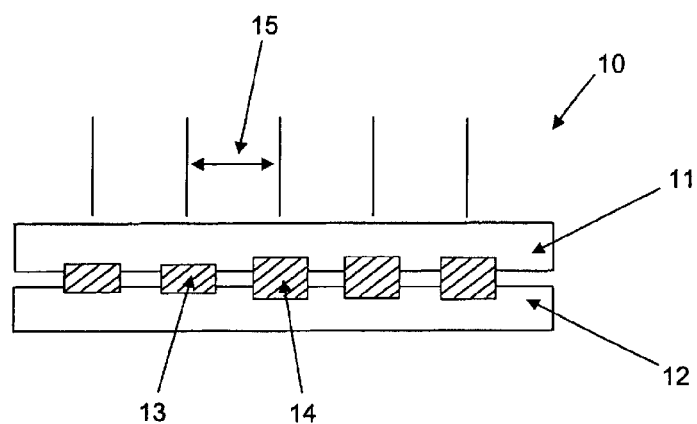
FIG. 2 shows a schematic diagram of a flexible flat cable according to the present invention.

As shown schematically in FIG. 2, flexible flat cable 10, shown here as a flat ribbon cable, includes a first signal lead 13 embedded between two layers 11, 12 of non-woven fabric. Flat cable 10 also includes a second signal lead 14, having a larger cross than that of first signal lead 13. The first and second signal leads 13, 14, are arranged to be spaced from one another at a pitch 15.

In the following, the present invention will be explained in greater detail with reference to examples.

EXAMPLE 1

A flexible flat cable composed of two spunbonded polyethylene terephthalate nonwoven fabrics is manufactured in that the electrical signal leads having a thickness of 30 μm are laminated in between the spunbonded nonwoven fabrics at a distance of 2.5 mm from each other at 120° C. with the aid of an adhesive nonwoven fabric of copolyamide.

EXAMPLE 2

A flexible flat cable composed of two spunbonded polyethylene terephthalate nonwoven fabrics is manufactured in that the spunbonded nonwoven fabrics are powdered with a mixture of a copolymide and an epoxy resin, a plurality of signal leads having a thickness of 30 μm are placed at a distance of 2.54 mm from each other, and laminated at 160° C.

EXAMPLE 3

A flexible flat cable composed of two spunbonded polyethylene terephthalate nonwoven fabrics is manufactured in that the spunbonded nonwoven fabrics are powdered with a polyurethane hot melt adhesive, electrical signal leads having a thickness of 30 μm are placed at a distance of 2.5 mm from each other, and laminated at 165° C.

EXAMPLE 4

A flexible flat cable composed of two spunbonded polyethylene terephthalate nonwoven fabrics is manufactured in that the spunbonded nonwoven fabrics are powdered with a mixture of a copolyamide and an epoxy resin, a plurality of signal leads having a thickness of 30 μm are placed at a distance of 2.54 mm from each other, and laminated at 175° C.

The dimensional stability after thermal treatment at 140° C. for 30 minutes and 24 hours was assessed in comparison with a standard film flat cable. The results are summarized in the following table:

| Material name | Shrinkage in % | |
| --- | --- | --- |
| | 30 minutes at 140° C. | 24 hours at 140° C. |
| standard table | −0.03 | −0.30 |
| example 1 | 0.03 | 0.05 |
| example 2 | −0.04 | −0.02 |
| example 3 | 0.04 | 0.05 |
| example 4 | 0.01 | −0.03 |

What is claimed is:

1. A flexible flat cable comprising:
    at least two layers of nonwoven fabric, the fabric consisting of fibers selected from the group consisting of polyester, polyamide, polyolefin, syndiotactic polystyrene, polysulfone, and glass, the fabric having pores between the fibers;
    a first signal lead embedded between the at least two layers; and
    a binder disposed in the pores so as to provide the fabric with at least one of a dielectric strength of at least 500 V and a dimensional stability of at least 0.05% at a temperature of 140° C. over a period of 24 hours.

2. The flat cable as recited in claim 1 wherein the flat cable is a ribbon cable.

3. The flat cable as recited in claim 1 further comprising a second signal lead having a cross-section different from a cross-section of the first signal lead.

4. The flat cable as recited in claim 1 further comprising a second signal lead made of a material different from a material of the first signal lead.

5. The flat cable as recited in claim 1 wherein the first signal lead includes at least one of a light conductor and a current conductor.

6. The flat cable as recited in claim 1 wherein the first signal lead is an electrical signal lead having a thickness of 5 μm to 200 μm and a length equal to or greater than the thickness.

7. The flat cable as recited in claim 1 further comprising a second signal lead wherein the wherein the first and second signal leads are arranged at a pitch of 1.25, 1.27, 2.5, or 2.54 mm.

8. The flat cable as recited in claim 1 further comprising at least one flame retardant.

9. The flat cable as recited in claim 8 wherein the fabric includes leather fibers as the flame retardant.

10. The flat cable as recited in claim 9 wherein leather fibers include residues from a production of chrome leather.

11. The flat cable as recited in claim 1 wherein the binder includes at least one of thermoplastic polyolefins, polyesters, polyimides, polyamides, polyacrylates, polyurethanes, and nitrile butyl rubber.

* * * * *